United States Patent [19]

Frank et al.

[11] Patent Number: 4,979,977
[45] Date of Patent: Dec. 25, 1990

[54] BENDING IRON HAVING MEMBER TO EFFECT REVERSE BEND AND METHOD OF USING SAME

[75] Inventors: Robert G. Frank; Thomas J. Reese, both of Sarver, Pa.

[73] Assignee: PPG Industries, Inc., Pittsburgh, Pa.

[21] Appl. No.: 408,829

[22] Filed: Sep. 18, 1989

[51] Int. Cl.⁵ ............................................ C03B 23/027
[52] U.S. Cl. ..................................... 65/107; 65/103; 65/287; 65/288; 65/291
[58] Field of Search ................ 65/103, 104, 107, 273, 65/287–291

[56] References Cited

U.S. PATENT DOCUMENTS

| | | | |
|---|---|---|---|
| 2,932,129 | 4/1960 | Alexander et al. | 65/103 |
| 3,155,485 | 11/1964 | Ritenour et al. | 65/287 |
| 3,278,287 | 10/1966 | Leflet et al. | 65/103 |
| 3,457,060 | 7/1969 | Leflet et al. | 65/107 |
| 3,976,462 | 8/1976 | Sutara | 65/288 |
| 4,305,746 | 12/1981 | Hagedorn et al. | 65/107 |
| 4,375,978 | 3/1983 | Reese et al. | 65/287 |
| 4,508,556 | 4/1985 | Bennett et al. | 65/25.4 |
| 4,606,749 | 8/1986 | Nushi et al. | 65/106 |

*Primary Examiner*—Joye L. Woodard
*Attorney, Agent, or Firm*—Andrew C. Siminerio; Donald C. Lepiane

[57] ABSTRACT

A method and apparatus for controlling the shape of heat softened glass sheets. A pan member is positioned inboard of the shaping rails of a bending iron. The upper surface of the pan member has a curvature corresponding to the final desired shape of a selected portion of the glass sheet. As the glass sheet is heated and sags to conform with the contoured shaping rail, it also sags into contact with the pan member and conforms to its shape.

14 Claims, 2 Drawing Sheets

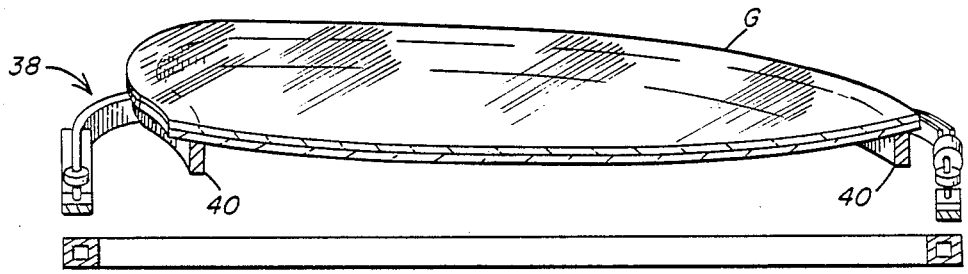
PRIOR ART  FIG. 2
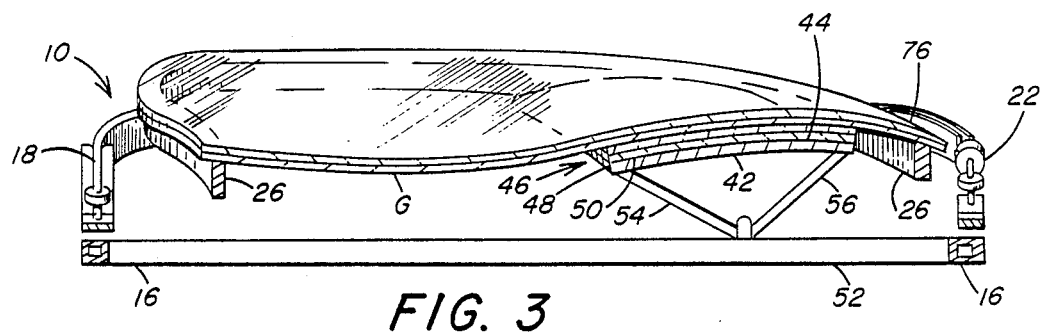
FIG. 3
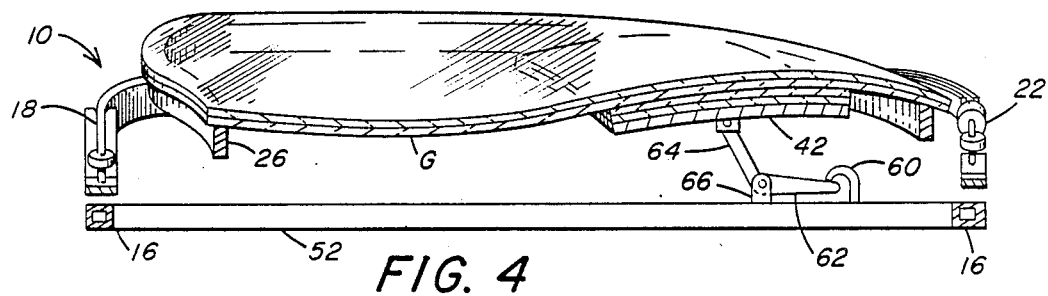
FIG. 4
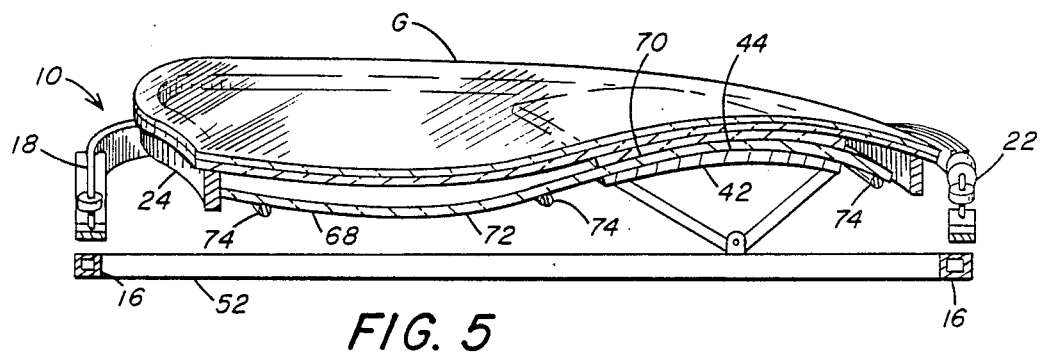
FIG. 5

BENDING IRON HAVING MEMBER TO EFFECT REVERSE BEND AND METHOD OF USING SAME

BACKGROUND OF THE INVENTION

1. Field of the Invention

This invention relates to the shaping of glass sheets and in particular to bending iron molds for forming reverse curvatures in hot glass sheets.

2a. Technical Considerations

Bent glass sheets are commonly used as glazing closures in vehicles such as automobiles and the like. For such applications the glass sheets must be bent to precisely defined curvatures dictated by the configuration and outline of the openings in the vehicles in which the bent sheets are to be installed as well as the overall vehicle styling. At the same time it is important that the bent sheets meet stringent optical requirements so that the viewing area of the resulting shaped window is free of optical defects that would interfere with good vision through the window. After forming, the windows may be heat strengthened to increase their resistance to damage resulting from impact.

The trend in automotive styling toward the use of glass closures that conform with the shape of the vehicle requires more complicated shapes which in turn require additional bending techniques. These new configurations include compound bends such as S-shaped curves, i.e., a reverse curvature along one direction of the glass sheet.

It is common practice in the glass sheet bending art to press bend the glass sheets supported in a horizontal position either on a series of conveyor rolls or by a gaseous hearth bed which supports the glass in close relation thereover by hot gas, lifting the glass from proximity to the support plane provided by either the conveyor rolls or the gaseous support bed into engagement with a vacuum holder and then depositing the glass onto a ring-like member which is interposed between the plane of support and the bottom surface of the vacuum holder.

In the heating and shaping of glass sheets, it is also common practice to use contoured bending molds that support a flat glass sheet and convey it through a heating lehr. As the temperature of the glass increases and approaches its heat softening temperature, it begins to sag under the force of gravity and conforms to the contours of the shaping rails on the mold. If required, the bending molds may include hinged end sections to help facilitate bending portions of the glass sheet to sharp curvatures that could not normally be obtained through normal sag bending techniques. Where windshield glass is being shaped, two glass sheets or doublets, may be conveyed through the lehr on the bending mold and shaped simultaneously.

Prior to this present invention, a reverse curvature in a midportion of a glass sheet on a bending mold conveyed through a heating lehr could not be made in a conventional sag bending operation because there was no way to sag the glass to a reverse configuration.

2b. Patents of Interest

U.S. Pat. No. 2,932,129 to Alexander et al. teaches the bending or a pair or glass sheet blanks on an outline bending mold and subsequent cutting of the bent glass sheets to shape.

U.S. Pat. No. 3,155,485 to Ritenour et al. teaches a bending mold shaping rail with non-marring inserts. In particular, a block of graphited carbon is located at the cut point of an articulating outline mold such that a rigid glass sheet is supported on the graphited blocks prior to heating.

U.S. Pat. Nos. 3,976,462 to Sitara and 4,375,978 to Reese et al. disclose bending iron molds used in sag bending operations. Each includes contoured shaping rails supported by posts on a main support frame that is conveyed through a heating lehr. Flat glass sheets are positioned on the shaping rail of the bending mold and sag into contact with the rails as the glass sheets are heated in the lehr.

U.S. Pat. No. 4,305,746 to Hagedorn et al. teaches a press bending arrangement including a ring type mold construction and a plurality of shaping pads mounted within the outline of the shaping ring. The heat softened glass sheet is conveyed into a shaping station wherein the glass sheet is preliminarily bent by contoured conveying rolls. The glass sheet is then stopped, vertically lifted off the rolls by the shaping ring and shaping pads and pressed against an upper shaping mold. The ring mold and shaping pads thereafter lower the shaped glass sheet back onto the conveyor rolls which continue to convey the glass sheet downstream to a cooling area.

U.S. Pat. No. 4,508,556 to Bennett et al. teaches a method and apparatus for bending glass sheets to complicated shapes including an S-shaped transverse bend. Flat glass sheets are heated in a furnace and conveyed into a shaping station wherein the glass is supported on a formed gas hearth support bed. A curved outline lifting mold is positioned around the gas hearth support bed and lifts the hot glass sheets off the bed and into contact with an upper vacuum mold to form the desired "S" configuration. The outline mold is then lowered and a shuttle ring is positioned beneath the held glass on the upper vacuum mold to receive the glass and remove it from the shaping station for further processing.

U.S. Pat. No. 4,606,749 to Nushi et al. teaches a method and apparatus for shaping glass wherein heat softened glass sheets are lifted off supporting conveyor rolls and pressed between a pair of vertically aligned press faces. The lower press face is slotted to receive the conveyor rolls when the press face is in a lowered position. A first ring mold positioned about the periphery of the lower press face initially lifts the glass off the rolls and a main ring mold positioned about the lower press face forms the periphery of the glass.

SUMMARY OF THE INVENTION

The present invention provides a glass sheet bending mold to control the shape of central portions of a heat softened glass sheet. The mold includes a main support frame and a shaping rail having a supporting surface elevation and outline corresponding to the desired shape of the glass sheet slightly inboard of the glass sheet's perimeter. A pan member is positioned within the shaping rails to modify the shape of the glass sheet as it sags downwardly into contact with the pan member when the glass sheet is heated to its heat softening temperature. In one embodiment of the invention, the pan member has an upper glass sheet engaging surface that is curved so that as the heated glass sheet sags on the bending mold, the glass sheet is generally concave upward at those portions not in contact with the pan member, and generally convex upward at those portions that sag onto and are supported by the pan member. The glass engaging surface includes a heat resistant cover interposed between the glass sheet and the pan member.

The present invention also provides a method to control the shape of a glass sheet supported by the bending mold as the glass sheet and mold is conveyed through a heating lehr. As the glass sheet is heated to its heat softening temperature, the glass sheet begins to sag into conformity with the contours of the shaping rail upon which it is supported. The downward sagging movement of the glass sheet is limited at selected portions by positioning a pan member below the glass sheet such that the selected portions of the glass sheet sag into contact therewith. The selected portions assume the configuration of the pan member. In one embodiment of the invention, the upper surface of the pan member is convex so that the unsupported portions of the glass sheet are generally curved concave upwardly and the selected portions of the glass sheet supported by the pan member are generally curved convex upwardly.

BRIEF DESCRIPTION OF THE DRAWINGS

FIG. 2 is a cross-section of a prior art bending mold.

FIG. 3 is a cross-section of the bending mold shown in FIG. 1, with portions removed for clarity.

FIG. 4 is a cross-section similar to FIG. 3 of an alternate embodiment of the invention.

FIG. 5 is a cross-section similar to FIG. 3 of an alternate embodiment of the present invention.

DETAILED DESCRIPTION OF THE INVENTION

Figure 1:
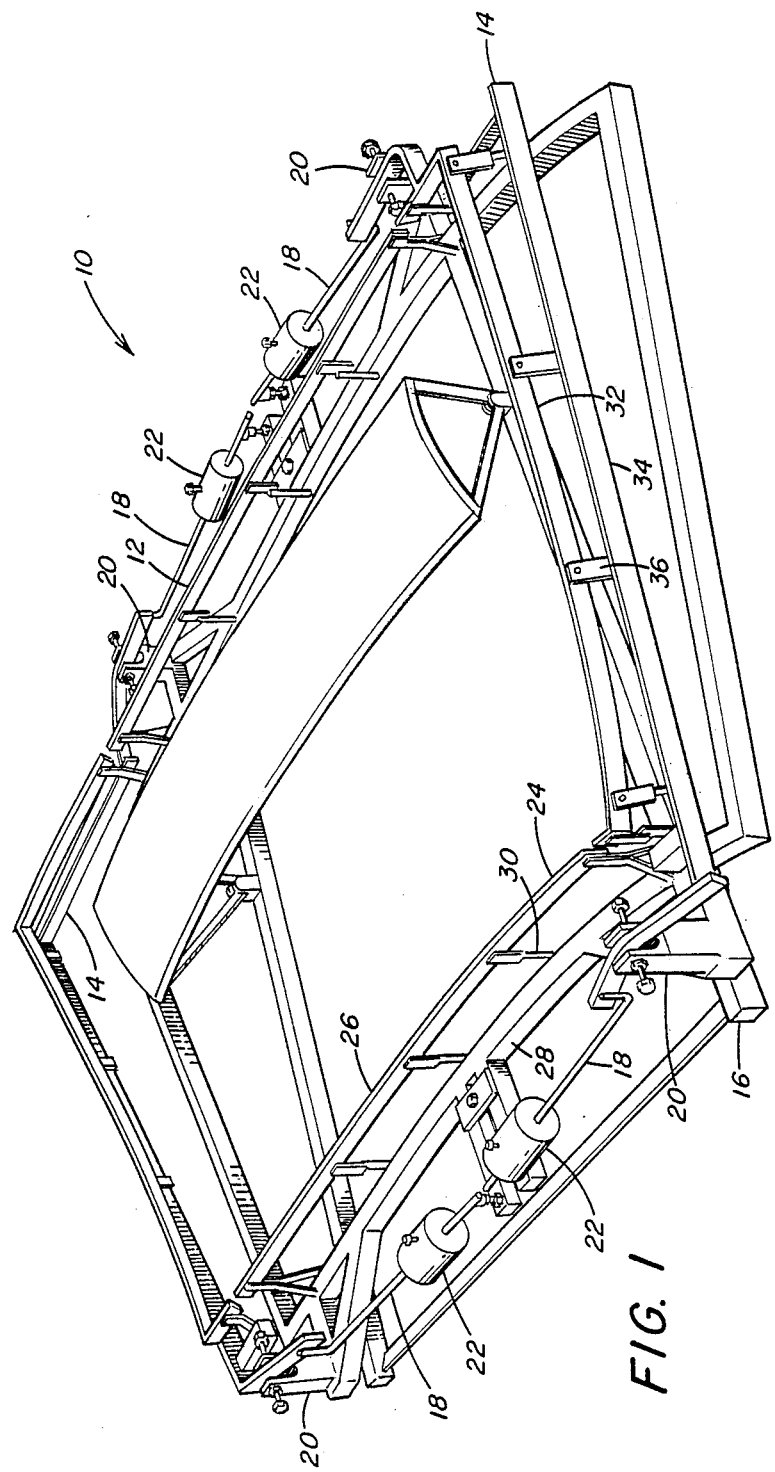
FIG. 1 is an isometric view of a bending mold incorporating portions of the present invention, with portions removed for clarity.

Although the present invention is shown in use with shaping one or more glass sheets, it is understood that it may be used to control the curved configuration of other materials, such as but not limited to acrylics and polycarbonate.

Referring to FIG. 1, glass bending mold 10 is an articulating mold similar to that disclosed in U. S. Pat. No. 3,976,462 to Sitara, but nonarticulating molds similar to U. S. Pat. No. 4,375,978 to Reese et al may also be used in the present invention. Although not limiting in the present invention, the mold 10 comprises a central mold portion 12 flanked by two pivoting mold end sections 14. The mold 10 is supported for movement through a heating lehr (not shown) by a main frame 16. Weight arms 18 are attached to each mold end section 14 and are mounted on frame 16 by hinge posts 20. Arms 18 are provided with counterweights 22 at their longitudinal inward extremities which tend to rotate the mold end sections 14 about hinge posts 20 from an open position (not shown) to a closed position as depicted in FIG. 1. Weight arms 18 are positioned laterally outside shaping rails 24 of the bending mold 10.

Shaping rails 24 of the mold 10 include central shaping rails 26 supported from rigid reinforcing bars 28 by members 30 in the central portion 12 and end shaping rails 32 supported from reinforcing bars 34 by members 36 in each mold end section 14. Reinforcing bars 28 in the central mold section 12 are rigidly attached to frame 16 while reinforcing bars 34 in each end mold section 14 are pivotally mounted on frame 16 through hinge post 20. When the mold sections 14 are in their pivoted upright and closed position as shown in FIG. 1, the elevational contour of the shaping rail 24 defines the final desired contour of the shaped glass sheet slightly inboard of the glass sheet perimeter.

FIG. 2 shows a prior art bending mold 38 with shaping rails 40 and illustrates the configuration of a pair of glass sheets G, or doublets, that are formed by conventional sag bending techniques. As can be seen, the glass sheets G have a simple configuration with no reverse curvatures.

Referring to FIGS. 1 and 3, which illustrate the preferred embodiment of the present invention, a pan member 42 is positioned on the mold 10 within an area defined by the shaping rails 24. Glass sheet engaging surface 44 of the pan 42 may be contoured such that at least a portion of the engaging surface 44 is convex upward to form a reverse curvature in the glass sheets G, as will be discussed later. Although not limited in the present invention, to form a desired reverse curvature or "S" shape configuration in the transverse direction of the glass sheets G, i.e. from left to right as shown in FIGS. 1 and 3, the pan 42 is positioned to extend along and generally between the central shaping rails 26 of the central mold section 12. The pan 42 is made of a heat resistant material, such as, but not limited to steel or ceramic. In a preferred embodiment of the invention, the surface 44 of the pan 42 is provided with a heat resistant cover 46. Referring to FIG. 3, cover 46 includes a fiberglass cloth or a dense ceramic fiber paper 48, such as that available from Sohio Engineered Material Co. under the tradename FIBERFRAX 970-J, and an insulating blanket 50, such as that available from Babcock and Wilcox under the tradename KAOWOOL ZR.

The pan 42 may be supported on mold 10 in any convenient fashion. Although not limiting in the present invention, in the particular embodiment illustrated, FIGS. 1 and 3, the pan 42 is supported on cross members 52 of main frame 16 by support arms 54 and 56.

In operation, one or more glass sheets are positioned on the mold 10 and heated to its heat softening temperature. Engaging surface 44 of the pan 42 is preferably located below the highest points of the shaping rail 24 of mold 10 so that when the rail 24 is supporting rigid flat glass sheets G, lower major surface of the lower most one of the glass sheets G as viewed in FIG. 4 does not contact the surface 44 until the glass sheets G are heated and begins to sag thereon. The interior portions of the glass sheets that do not sag into contact with the pan member 42 will assume a concave upward curvature while those portions of the glass sheets that sag into contact with the pan member 42 assume a convex upward configuration, corresponding to the curvature of the engaging surface 44. As a result the glass sheets G are formed to a reverse curvature configuration between the unsupported portion and the portion that contacts and is supported by the pan 42. After the forming operation is complete, the glass sheets G are cooled.

When the cooling operation is performed while the glass sheets G remains on the bending mold 10, as would be the case when the bent glass is for a windshield and the glass is annealed, if desired, the pan 42 may be moved away from the glass sheets G to provide better circulation of air around the glass sheets for more effective cooling. Referring to the particular embodiment of the invention illustrated in FIG. 4, hook 60 may be disengaged, either mechanically or electrically, from end 62 of pivoting support arm 64 which supports the pan 42, allowing the pan 42 to rotate downward about post 66 and away from the glass sheets G. In FIG. 4, this rotation would be in a counterclockwise direction. The pan 42 may move downward by its own weight, or, if necessary, auxiliary means may be used to rotate pan 42, such as, but not limited to, springs connecting (not shown) arm 64 with frame member 52.

It has been observed that the pan member 42 acts as a heat sink during the heating and sag bending operation, causing non-uniform cooling of the shaped glass G by reducing the cooling rate of the glass G. As a result, there are localized high tensile stresses in the glass in the vicinity of the pan member 42. To reduce this stress, an insulating blanket 68 is positioned within the area of the mold 10 defined by rail 24 as shown in FIG. 5. A portion 70 of blanket 68 is draped over the pan member 42 to insulate the glass sheets G from the surface 44 with remaining blanket portions 72 positioned in spaced apart relation below the glass sheets G, and preferably extending to the shaping rails 24. The blanket 68 "evens out" the cooling rate of the glass sheets G by keeping the entire sheets at a more uniform temperature as the sheets are cooled after shaping. Any gaps in the rail 24 or spaces in the blanket 68 should be filled to prevent air flow under the glass sheets G that would adversely affect the uniform glass cooling rate. Although not limiting in the present invention, in one particular embodiment of the invention the blanket 68 is a KAO-WOOL ® RZ insulting material blanket supported below glass sheets G by a framework 74, which may be, for example expanded metal or wire as shown in FIG. 5.

Based on the teachings of this disclosure, it would be apparent to those skilled in the art that the present invention can be combined with other shaping techniques. Although not limiting in the present invention, it has been found that auxiliary pressing members (not shown) may be used to engage peripheral portions of the glass sheet G, for example edge 76 shown in FIG. 3, and press it downward against the underlying shaping rail to help bend the glass sheet G over the pan member 42 and conform the glass sheet periphery to the contour of the shaping rail 26.

It can also be appreciated by one skilled in the art that the present invention is not limited only to forming reverse curvatures in heated glass sheets. The engaging surface 44 of the pan member 42 may be used to limit the sag of the glass sheet G without imparting a reverse curvature. For example, the engaging member 44 may be concave so that the entire glass sheet is concave upward, with the engaging surface 44 imparting a specific curvature in the glass sheet G. Furthermore, if required, the engaging surface 44 of the pan member 42 may be flat so as to eliminate any curvature in a selected portion of the glass sheet G.

The bending operation described herein may be used for single or multiple sheets of glass. It is contemplated that if required, the bottom ply of glass may act as a disposable burn plate to take any marking from the pan 42 and/or shaping rails 24.

The form of the invention shown and described in this disclosure represents an illustrative preferred embodiment thereof. It is understood that various changes may be made without departing from the spirit of the invention defined by the claimed subject matter that follows.

We claim:

1. In a method of shaping glass sheets by sag bending, including the steps of positioning a glass sheet to be shaped on a support frame having a shaping rail with a support surface that conforms in elevation and outline to the desired shaped of said sheet to be shaped slightly inboard of the sheet perimeter, moving said frame with said glass sheet supported thereon through a heating means to heat said sheet to its deformation temperature so that said glass sheet sags into contact with said shaping rail, the improvement comprising:

sagging selected portions of said glass sheet inboard of said glass sheet perimeter into contact with a support member positioned inboard of said shaping rail, wherein said selected portions conform to the contours of said support member.

2. The method as in claim 1 further including the step of removing said support member from contact with said glass sheet after said sheet conforms to the contours of said support member.

3. The method as in claim 1 further including the step of cooling said glass sheet.

4. The method a set forth in claim 1 wherein the shaping rail defines an area and further including the step of:

prior to the practice of the step of positioning the glass sheet, placing a heat resistant cover within the area defined by the shaping rail.

5. A method of shaping a sheet such that the sheet has a reverse bend, comprising:

supporting a sheet at it perimeter:

heating said sheet to its heat softening temperature while supporting said sheet;

allowing a first portion of said sheet inside of said perimeter to sag in a predetermined direction; while engaging a second portion of said sheet inside said perimeter to limit sagging of said second portion in said predetermined direction such that said first portion sags in said predetermined direction more than said second portion sags in said predetermined direction.

6. The method as set forth in claim 5 wherein said step of supporting a sheet includes:

positioning a heat resistant cover under the sheet.

7. In an outline gravity-type bending mold for shaping a hot glass sheet, wherein the mold comprises a support frame for movement through a heating means a shaping rail having a sheet supporting surface; means for mounting the shaping rail on the support frame such that the sheet supporting surface has a predetermined elevation, the improvement comprising:

a pan member having a sheet supporting surface; and
means for mounting said pan member on the frame in spaced relation to the shaping rail such that the supporting surface of said pan member is in a fixed position relative to the supporting surface of the shaping rail.

8. The improved mold as set forth in claim 7 wherein said means for mounting said pan member in the fixed position comprises:

a hook;
hook retaining means; and
means for selectively mounting said hook and said hook retaining means to the frame and said pan member such that said hook and said hook retaining means maintains said pan member in the fixed position.

9. The improved mold as set forth in claim 7 wherein the support frame includes a pair of spaced central rails, the central rails each having a sheet supporting surface, and a pair of end rails, the end rails each having a sheet supporting surface; the means for mounting the shaping rail include means for mounting the central rails on the frame, means for pivotally mounting the pair of end rails on the support frame spaced from one another about the central rails, and means for moving the pair of end rails from a first position where the sheet supporting surfaces of the pair of end rails and the pair of central rails are generally aligned to receive a sheet to be shaped to a second position where the supporting surface of the pair of end rails are above the supporting surface of the central rails, and said means for mounting said pan member includes means for mounting said pan member in the fixed position as the pair of end rails from the first position to the second position.

10. The improved mold as set forth in claim 9 wherein said means for mounting said pan member mounts said pan member in the fixed position such that the supporting surface of said pan member is below the highest elevation of the supporting surfaces of the pair of central rails or end rails.

11. The improved mold as set forth in claim 7 wherein said means for mounting said pan member mounts said pan member in the fixed position such that the supporting surface of said pan member is below the highest elevation of the supporting surface of the rail.

12. The improved mold as in claim 11 wherein at least a portion of the sheet supporting surface of said pan member is convex upward.

13. The improved mold as in claim 12 further including a heat resistant cover overlaying the sheet supporting surface of said pan member.

14. The improved mold as in claim 13 wherein the shaping rail defines an area and said heat resistant cover includes an insulating blanket extending substantially throughout the area defined by the shaping rail.

* * * * *

UNITED STATES PATENT AND TRADEMARK OFFICE
CERTIFICATE OF CORRECTION

PATENT NO. : 4,979,977

DATED : December 25, 1990

INVENTOR(S) : Robert G. Frank et al.

It is certified that error appears in the above-identified patent and that said Letters Patent is hereby corrected as shown below:

Column 6, line 43, after "means" insert --;--.

Column 7, line 12, after "rails", insert --move--.

Signed and Sealed this

Fifteenth Day of December, 1992

*Attest:*

DOUGLAS B. COMER

*Attesting Officer*     *Acting Commissioner of Patents and Trademarks*